United States Patent
Kothari et al.

(10) Patent No.: US 10,521,740 B2
(45) Date of Patent: Dec. 31, 2019

(54) AUTOMATED ECM PROCESS MIGRATOR

(71) Applicant: Accenture Global Solutions Limited, Dublin (IE)

(72) Inventors: Mitesh Kothari, Maharashtra (IN); Sunil Khatri, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 238 days.

(21) Appl. No.: 15/645,488

(22) Filed: Jul. 10, 2017

(65) Prior Publication Data
US 2018/0330289 A1  Nov. 15, 2018

(30) Foreign Application Priority Data

May 9, 2017  (IN) .............................. 201741016252

(51) Int. Cl.
*G06Q 10/00* (2012.01)
*G06Q 10/06* (2012.01)
*G06F 16/11* (2019.01)

(52) U.S. Cl.
CPC ......... *G06Q 10/063* (2013.01); *G06F 16/119* (2019.01)

(58) Field of Classification Search
None
See application file for complete search history.

(56) References Cited

U.S. PATENT DOCUMENTS

| | | | |
|---|---|---|---|
| 6,721,713 B1* | 4/2004 | Guheen ................. | G06Q 50/01 705/1.1 |
| 6,904,449 B1* | 6/2005 | Quinones .............. | G06Q 10/10 709/203 |
| 7,315,826 B1* | 1/2008 | Guheen ................. | G06Q 10/06 705/7.29 |
| 7,610,233 B1* | 10/2009 | Leong ................. | G06Q 10/087 705/26.3 |

(Continued)

OTHER PUBLICATIONS

Todorovich, Jessica, Project Management Plan (ECM), Oct. 16, 2015, https://www.google.com/search?q=ecm+migration+manager+activity+framework&rlz=1C1GCEB_enUS775US775&source=Int&tbs=cdr%3A1%2Ccd_min%3A%2Ccd_max%3A5%2F9%2F2017&tbm= , p. 1-21.*

(Continued)

*Primary Examiner* — Joseph M Waesco
(74) *Attorney, Agent, or Firm* — Fish & Richardson P.C.

(57) ABSTRACT

Methods, systems, and apparatus, including computer programs encoded on computer storage media, for an automated enterprise content management (ECM) migrator. One of the methods includes generating, by an enterprise content management process migration engine (ePME), a migration profile for migrating data from a first ECM system to a second ECM system. Determining content to extract associated with a process template from the first ECM system. Identifying at least one process and at least one activity associated with the at least one process associated with the process template. Determining at least one classification associated with the at least one process activity in the (Continued)

process template. Generating a database in the second ECM system storing each of the at least one process, the at least one activity, and the associated at least one classification from the template. Validating a successful transaction between the first ECM system and the second ECM system.

20 Claims, 9 Drawing Sheets

(56) References Cited

U.S. PATENT DOCUMENTS

| | | | | |
|---|---|---|---|---|
| 7,774,772 | B2* | 8/2010 | Tal | G06F 8/65 |
| | | | | 717/172 |
| 8,121,874 | B1* | 2/2012 | Guheen | G06Q 10/063 |
| | | | | 705/7.11 |
| 8,484,645 | B2* | 7/2013 | Chandnani | G06F 9/5027 |
| | | | | 718/101 |
| 8,862,600 | B2* | 10/2014 | Nagarajan | G06F 11/203 |
| | | | | 707/755 |
| 9,182,963 | B2* | 11/2015 | Mallya | G06F 8/60 |
| 9,436,712 | B2* | 9/2016 | Srinivasan | G06F 16/214 |
| 2001/0052108 | A1* | 12/2001 | Bowman-Amuah | ........ |
| | | | | G06Q 10/06 |
| | | | | 717/100 |
| 2004/0107125 | A1* | 6/2004 | Guheen | G06Q 50/01 |
| | | | | 705/319 |
| 2006/0059253 | A1* | 3/2006 | Goodman | G06Q 10/10 |
| | | | | 709/223 |
| 2008/0005194 | A1* | 1/2008 | Smolen | G06F 16/2308 |
| 2008/0072290 | A1* | 3/2008 | Metzer | G06F 16/2308 |
| | | | | 726/3 |
| 2011/0208822 | A1* | 8/2011 | Rathod | G06F 16/9535 |
| | | | | 709/206 |
| 2011/0289054 | A1* | 11/2011 | Johnson | G06F 21/604 |
| | | | | 707/626 |
| 2012/0042000 | A1* | 2/2012 | Heins | G06Q 10/10 |
| | | | | 709/201 |
| 2013/0006680 | A1* | 1/2013 | O'Sullivan | G06Q 10/00 |
| | | | | 705/7.11 |
| 2013/0117289 | A1* | 5/2013 | Fischer | G06F 16/214 |
| | | | | 707/756 |

OTHER PUBLICATIONS

Whitepaper, "Introduction to the Data Migration Framework (DMF) in Microsoft Dynamics," Junction Solution Where Platform Meets Inspiration, 2012, 21 pages.

* cited by examiner

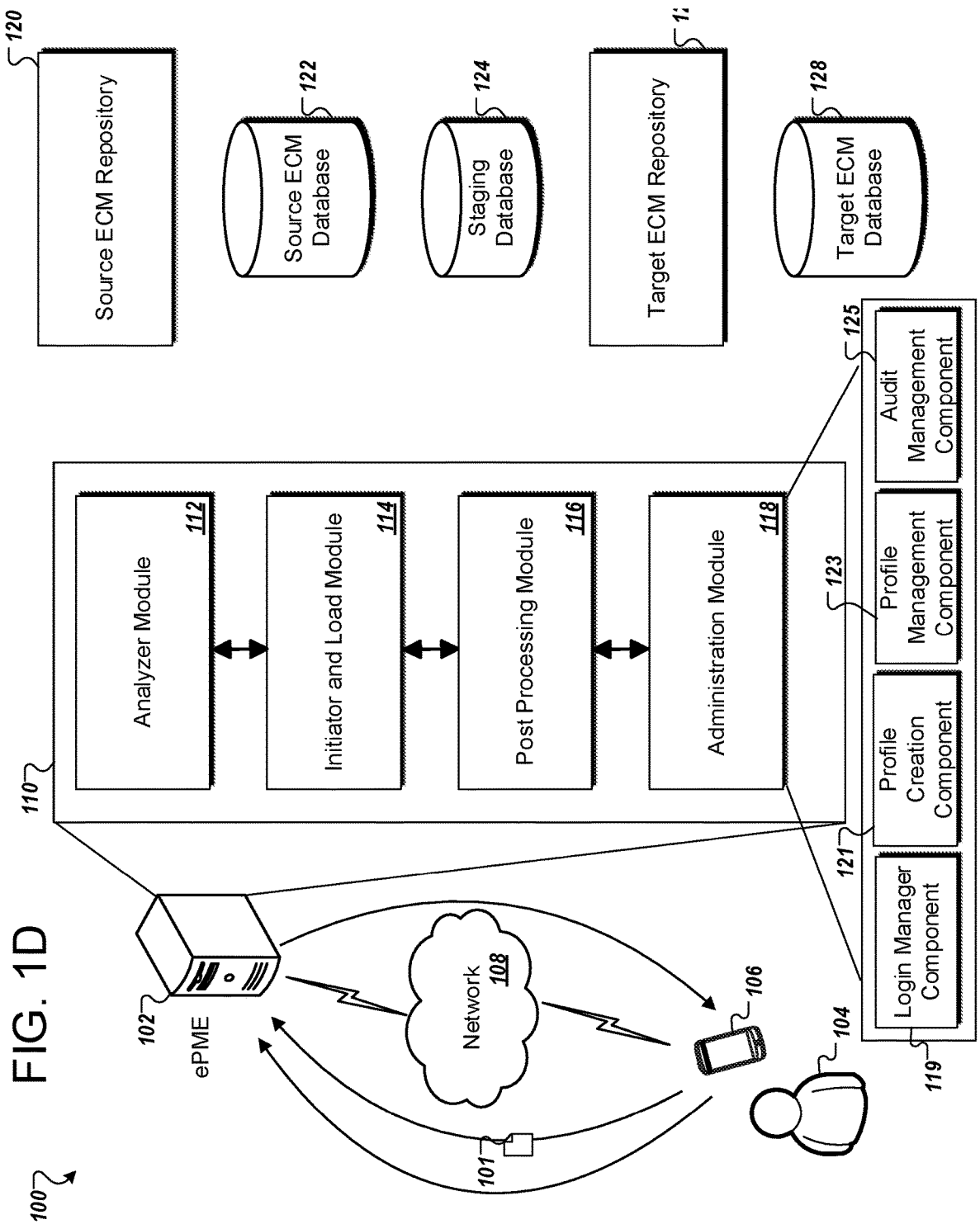

AUTOMATED ECM PROCESS MIGRATOR

CROSS-REFERENCE TO RELATED APPLICATION

This application claims priority to Indian Provisional Patent Application No. 201741016252, filed on May 9, 2017, entitled "Automated ECM Process Migrator," the entirety of which is hereby incorporated by reference.

BACKGROUND

This specification relates to migrating business processes in an enterprise content management (ECM) system, and more particularly, to migrating business processes from one ECM system to another ECM system.

ECM systems can be used to ensure process management uniformity in business industries. Specifically, ECM systems attempt to organize, manage, and distribute a business's documents that relate to the business's processes using various integrated components.

SUMMARY

The subject matter of the present disclosure describes technologies for migrating business processes from one Enterprise Content Management (ECM) system to another ECM system. These technologies generally involve ECM processes for particular industries. For example, fast growing industries such as insurance, finance, and pharmaceuticals are heavily process dependent in many aspects of their business. Specifically, these fast growing industries may ensure each department uses the same common process management solution for uniformity in implementation and processing across the business. For example, these fast growing industries may use an ECM system to ensure uniformity across the business. An ECM system may help these fast growing industries organize, manage, and distribute business related content such as documents, images, health or accounting records, surveys, product information, emails, and web pages. In addition, businesses may utilize ECMs to store, track, edit, and collaborate on content creation and other information-related projects, while maintaining predefined and appropriate security levels. For example, ECM systems may include standalone components such as DocuShare, Laserfiche, FileNet, SAVO, and OpenText.

In some aspects, a business may want to transition from a current ECM system to a new ECM system in response to an event. For example, the event may be an initiated merger and acquisition (M&A) event or a current ECM system may not have certain desired features or functionality required by the business. In another example, a current ECM system may not be compatible with particular product stacks that the business uses, such as office productivity suites or web standards. In another example, a current ECM system may not return results from active processes in a timely manner during events, such as a litigation event or government regulation event. Additionally, transitioning from one ECM system to another ECM system is often a manual error-prone process and not efficient for fast growing industries. Therefore, there is a need for an automatic process migration tool that migrates one ECM system to another ECM system. The process migration tool should be comprehensive, precise, and ideally error free, ideally ensuring no business activities are missed and that the business can maintain quality of service before and after the transition.

An Enterprise Content Management Process Migration Engine (ePME) is described to automatically transition a business from one ECM system to another ECM system. In addition to moving from one ECM system to another ECM system, the ePME can also migrate business processes from multiple ECM systems to a single ECM product to provide the user with more functionality. Specifically, the merge allows the user to choose from various functionalities provided by each of the multiple ECM systems from one location using the single ECM product. The ePME defines a set of interfaces for users to implement rules and profiles for performing the automatic migration. Users may log in to the ePME using an extraction profile. The extraction profile may be defined by a user profile that includes login credentials associated with a user accessing the ePME, a detailed action list associated with actions performed on ECM systems and ECM system repositories while in the ePME, and a report of any audits performed on the ePME system. An ECM system repository includes information relating to the ECM system, which may include each of the functionalities utilized by the ECM system and an indication of data stored in an associated ECM database. This will be further described below. The interfaces support a centralized login and logoff location, a declaration for creating extraction profiles, profile deletions and updates, audit trails, profile reporting, batch processing results, and automated unit testing on a target ECM system repository. Specifically, the ePME is based on the following modules to perform the automatic migration: an analyzer module, an initiator and load module, a post processing module, and an administration module.

In general, one innovative aspect of the subject matter described in this specification can be embodied in methods that include the actions of generating, by an enterprise content management process migration engine (ePME), a migration profile for migrating data from a first enterprise content management (ECM) system to a second ECM system. Determining content to extract associated with a process template from the first ECM system. Identifying, by the ePME, at least one process and at least one activity associated with the at least one process in the process template. Determining, by the ePME, at least one classification associated with the at least one process activity in the process template. Generating, by the ePME, a database in the second ECM system storing each of the at least one process, the at least one activity, and the associated at least one classification from the template. In response, the ePME validates successful transaction between the first ECM system and the second ECM system.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. In some implementations, the method further includes, in response to storing the at least one process activity and the at least one associated classification from the process template, auditing, by the ePME, at least one event associated with the migrating data in the migration profile. At least one classification can include a process profile ID, a process name, an activity name, an activity type, an activity performer, a type of performer, a source activity, a target activity, and a connectivity type. The method can further include providing, by the ePME, at least one notification to the client device in response to the at least one event associated with the migrating data in the migration profile. In response to validating the successful transaction as unsuccessful, the method can retrieve the migration profile and execute the migration profile to correct the unsuccessful transaction. The method can further include storing, by the ePME, the database in the second ECM system with the migration profile in response to generating the database in the second ECM system. The method can receive, by the ePME, a selection of the process template from the client device in response to providing a list of process templates to the client device. The method can include comparing, by the ePME, the data in the second ECM system to staging data indicating the at least one process and the least one activity associated with the at least one process associated with the process template in the first ECM system, generating, by the ePME, a summary report that comprises the successful transaction in response to determining a match between the data in the second ECM system to the staging data.

The subject matter described in this specification can be implemented in particular embodiments so as to realize one or more of the following advantages. For example, the ePME automatically extracts process templates from the source ECM system to ingest into the target ECM system. Additionally, the subject matter in this specification for migrating a source ECM process and associated data to a target ECM can be applied to any ECM system. Additionally, the ePME allows for a single point of access for users, such as administrators to create a migration profile, manage a staging database, manage the source ECM repository, manage the source ECM database, manage the target ECM repository, and manage the target ECM database. Additionally, irrespective of versions of the source ECM and the target ECM, this framework may be used with compatible vendors to perform the extraction and ingestion of the business processes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A, 1B, 1C, and 1D are block diagrams that illustrates an example of a system 100 for an automating an ECM process migration.

Like reference numbers and designations in the various drawings indicate like elements.

DETAILED DESCRIPTION

Figure 1A:
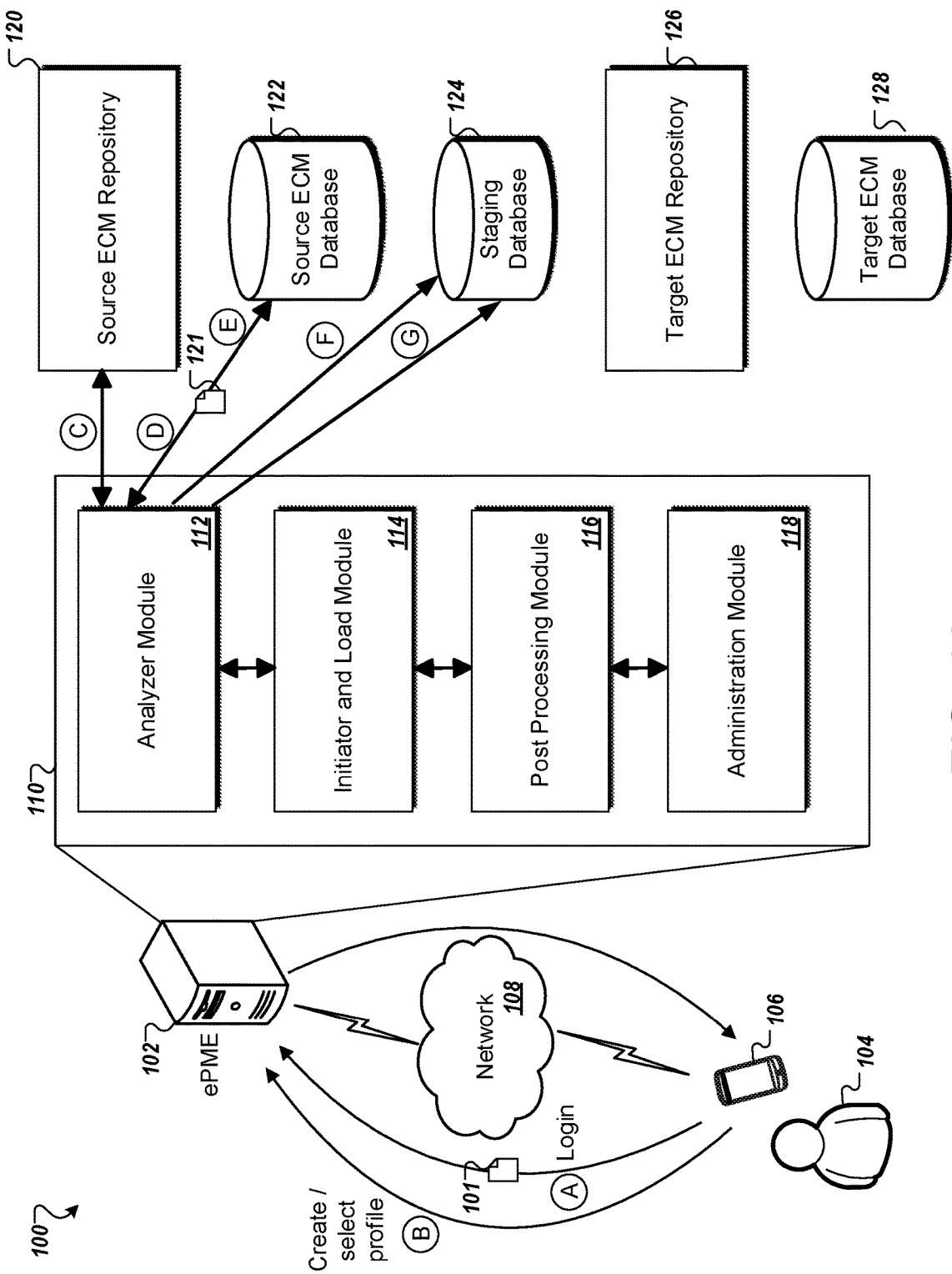

FIG. 1A is a block diagram that illustrates an example of a system 100 for an automatic ECM process migrator. The system 100 includes an ECM platform migrations engine (ePME) 102, internal components 110 of ePME 102, a source ECM repository 120, a source ECM database 122, a staging database 124, a target ECM repository 126, a target ECM database 128, a client device 106, and a network 108. The internal components 110 of the ePME 102 includes an analyzer module 112, an initiator and load module 114, a post processing module 116, and an administration module 118. FIG. 1A illustrates various operations in stages (A) through (G) which can be performed in the sequence indicated or in another sequence.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The system 100 can be used to migrate business processes from a source ECM system to a target ECM system. An ECM system includes strategies, methods, and tools used to organize and store a business's documents, and other content, that relate to the business's processes. Specifically, the ECM uses means of capturing, managing, storing, preserving, and delivering content and documents related to business processes. For example, an ECM may be enterprise systems such as IBM FileNet, DocuShare, Laserfiche, Alfresco, and OpenText, to name a few examples. The ECM may cover management of information within a scope of the business's enterprise whether that information comes in the form of a paper document, an electronic file, a database print stream, or an email, to name a few examples. Additionally, an ECM system covers document management, web content management, searching collaboration, record management, digital asset management (DAM), workflow management, capturing information, and scanning information. Primarily, an ECM system is aimed at managing the life-cycle of information from publication or creation through the archival and eventual disposal.

In general, an ECM system seeks to improve the management of corporate information for a business through simplifying storage, security, version control, and process routing, for example. In some implementations, a business utilizing an ECM system improves business process efficiency and process control, and reduces business costs. For example, businesses may no longer require storing paper copies of inventory in massive paper warehouses, but rather, storing electronic copies of paper inventory in the ECM system. One may only need to query the ECM system for an electronic copy of the paper inventory for fast processing and archival.

ECM systems can have a variety of characteristics. In some implementations, ECM systems may be used to incorporate applications into a transparent system. For example, an ECM system makes a user unaware that the user is using an ECM system with particular applications, such as office suite products and the internet. Additionally, an ECM system is used to manage business information without regard to the source or required usage of the business information. In some implementations, an ECM system can be used with a variety of applications. This is because an ECM system is provided as a service utilizing various components to include the variety of applications. Additionally, an important benefit of an ECM system is fitting infrastructure components into a multi-layer model. Each layer of the multi-layer model includes all document related technologies associated with a specific content in that layer. Specifically, the ECM system takes a business's company information in a single repository and orders the information with uniform structure. By doing this, an ECM system eliminates the need to include expensive and expansive redundancy operations by using only a single repository rather than multiple repositories while maintaining data consistency in a central location.

Functionally, an ECM system combines various functionalities that can be used as individual stand-alone systems for particular business needs. For example, an ECM system combines components or techniques such as capturing, managing, storing, preserving, and delivering to better handle business information.

In some implementations, an ECM system provides a capturing functionality. Capturing includes converting hard copy information, such as a business's paper documents, into an electronic format. For example, capturing may be performed be scanning the hard copy information. Additionally, capturing may include creating metadata associated with the hard copy information. The metadata may describe characteristics associated with the hard copy information such as location information, query values of the hard copy information, and searchable index values for locational reasons. For example, an ECM system may perform capturing by utilizing optical character recognition (OCR), handprint character recognition (HCR), and intelligent character recognition (ICR), to name a few examples.

In some implementations, an ECM system provides a managing functionality. Managing includes document management, collaboration between users, web content management, records management, and workflow process management. Each of the aforementioned components of managing address the ECM system's functionality of a lifecycle for a particular piece of document. Documents need to be managed in accordance with a business's policy, which in turn often must comply with federal, governmental, and industry standards. The collaborative component may include multiple applications for joint information processing. The joint information processing may include collaborative software packages utilized for database management across multiple users. Web content management, records management, and workflow process management may successfully utilize shared repositories, record administration, production workflow, and ad-hoc workflow to manage data seamlessly and transparently between users of an ECM system.

In some implementations, an ECM system provides a storing functionality. Storing includes performing short term storage for fast retrieval access. Storing can be divided into repositories, library services, and storing technologies to perform this functionality for an ECM system. Components for repositories may include file systems, content management systems, various databases, and data warehouses, to name a few examples. Each of these repositories may be used in combination with one another. Library services handle administrative components of accessing information provided by the capturing and managing functionalities. Specifically, library services provide the functionality of search and retrieval to a particular user accessing the ECM system. Storing technologies may include a wide variety of components utilized to store information. For example, the ECM system may use magnetic online media, magnetic tape storage, digital optical media, and cloud computing to store a business's proprietary information.

In some implementations, an ECM system provides a preserving functionality for long-term storage. Preserving includes performing long-term safe storage that includes storing, e.g., to comply with federal, governmental, and industry regulations. For example, long term storage may include electronic archiving, storing on magnetic tapes, magnetic disk storage, storage networks, or even paper. This may be used to store data for long term retrieval and access.

In some implementations, an ECM system provides a delivering functionality. The delivering functionality delivers documents from the managing, storing, and preserving components to users accessing the ECM system. Specifically, the delivering functionality provides the information stored and preserved to a user via secure distribution, collaboration, and by utilizing version control, including a concept of a sub-version. In some implementations, these functions are seen as stand-alone systems incorporated into the ECM system. For example, an ECM system may deliver documents from the managing, storing, and preserving components utilizing extensible markup language (XML) features, portable document formats (PDFs), and XML Paper specification (XPS), to name a few examples. Additionally, the delivering functionality of an ECM system may add securities to the delivered and distributed documents. The securities may be a public key infrastructure, digital rights management for document syndication, as well as electronic watermarkings for protecting document usage rights. In some implementations, the delivering functionality may deliver documents using distribution media such as the internet, e-mail, fax, mobile device communication, and data media transfer using USBs.

As mentioned above, businesses may require a transition from a current ECM system to a new ECM system in response to a particular event. Additionally, these businesses may require replacing various components of a current ECM system. For example, the business may want to transition from a current ECM system to a new ECM system because the current ECM system does not have desired features or components that the new ECM system does have. Additionally, a business may desire a particular component, such as adding a new application such as Outlook, to a current ECM system where the current ECM system does not support adding that additional component and the new ECM system does include support it. Currently, transitioning from one ECM system to another ECM system is often a manual error-prone process and is inefficient for businesses, such as fast growing industries. Therefore, an automatic process to transition from one ECM system to another ECM system seamlessly and while maintaining component and activity architecture is described here.

The ePME 102 can include one or more computers, and may include computers distributed across multiple geographic locations. The ePME 102 communicates with one or more data storage devices that provide access to a source ECM repository 120, a source ECM database 122, a staging database 124, a target ECM repository 126, and a target ECM database 128.

The client device 106 can be, for example, a desktop computer, a laptop computer, a tablet computer, a wearable computer, a cellular phone, a smart phone, a music player, an e-book reader, a navigation system, or any other appropriate computing device. The network 108 can be wired or wireless or a combination of both, and can include the Internet.

The ePME 102 can be part of an enterprise platform that allows users to migrate from a source ECM system to a target ECM system. The ePME 102 includes an analyzer module 112, an initiator and load module 114, a post processing module 116, and an administration module 118. The ePME 102 can receive login requests from user 104 and create a profile associated with the migration. In some implementations, the ePME 102 can merge multiple source ECM systems into a single target ECM system. As a result of the migration, the ePME 102 can provide a validation report of the migration to the user 104. The user 104 may review the validation report to determine whether the migration was successful.

The analyzer module 112 communicates with the source ECM repository 120, the source ECM database 122, and the staging database 124. In some implementations, the analyzer module 112 performs a first step in the automatic migration from a source ECM system to a target ECM system. Specifically, the analyzer module 112 is responsible for creating a migration profile associated with user 104. For example, user 104 may be an administrator of the source ECM system seeking to migrate to the target ECM system with a migration profile. The migration profile allows user 104 to identify process templates that apply to the data in the source ECM system. The process templates identified in the source ECM system will be transferred to the target ECM system. The analyzer module 112 then determines a number of processes associated with the identified process templates. Additionally, the analyzer module 112 determines a number of activities associated with each of the processes in the process template. Further, the analyzer module 112 can classify each activity in each of the processes as a manual or an automatic activity; determine a connectivity between each of the activities; determine the performer for each of the activities; and, determine a user and group identification associated with each manual activity. The analyzer module 112 may further generate level 1 staging information. Level 1 staging information may be defined to include exporting the identified relevant data from the source ECM repository 120 and the source ECM database 122 to a relational database management system (RBDMS), such as the staging database 124. The analyzer module 112 may determine a maximum reachability scenario for transitioning from the source ECM system to the target ECM system by utilizing the level 1 staging information. For example, the analyzer module 112 determines the maximum reachability scenario by analyzing the various connections between each activity in the source ECM system. Specifically, the analyzer module 112 determines the connections between each activity by analyzing the possible combinations of connections for each activity connected to one or more other activities in the source ECM system. The analyzer module 112 determines the connections to maintain a similar connection structure between activities during the migration and ultimately, in the target ECM system. In response to generating the architectural data, the ePME 102 associates the connection structure data with the generated migration profile. The implications of the maximum reachability scenario will be further explained below.

The initiator and load module 114 communicates with the source ECM repository 120, the source ECM database 122, the staging database 124, the target ECM repository 126, and the target ECM database 128. In some implementations, the initiator and load module 114 performs the second stage in the automatic migration process. Specifically, the initiator and load module 114 executes the migration profile generated during the processes performed by the analyzer module 112. The initiator and load module 114 retrieves data associated with the process profile ID, the process name, the activity name, the activity type, the activity performer, the type of performer, the source activity, the target activity, and the connectivity type from the level 1 staging area. For example, the initiator and load module 114 retrieves a process profile ID of "000000001", a process name of "Process Automation," an activity name of "Initiate," an activity type of "Manual" an activity performer of "User 1," a performer type of "User", a source activity of "Act 1," a target activity of "Act 2," and a connectivity type from the level 1 staging data as "Forward." The initiator and load module 114 can add the retrieved data from the level 1 staging data to the level 2 staging data. In some implementations, the initiator and load module 114 may analyze the level 2 staging data to check for any errors associated with the retrieved data from the level 1 staging data. In addition, the initiator and load module 114 may create a process template object in the target ECM repository 126 and store the level 2 staging data in the created process template object. Specifically, the initiator and load module stores the level 2 staging data in the created process template object in a framework or structure similar to the framework or structure found in the source ECM system. Once the initiator and load module 114 traverses each of the rows in the level 2 staging data, the initiator and load module 114 ends the migration process.

The post processing module 116 communicates with the staging database 124, the target ECM repository 126, and the target ECM database 128. In some implementations, the post processing module 116 performs the final stage of the automatic migration process. Specifically, the post processing module 116 retrieves the completed migration profile and executes the completed migration profile in order to generate a successful validation of the migration process. The migration process is executed again to perform connectivity tests between each activity and compare the data in the level 1 staging data to data in the level 2 staging data. In response to the comparison, the post processing module 116 reports a proper or improper functioning of the migration process to a user 104 that logged in with a particular migration profile.

The administration module 118 provides a set of user interfaces for a user, such as user 104, to manage extraction and ingestion of migration profiles. In some implementations, the administration module 118 provides user interfaces to allow user 104 to interact with the analyzer module 112, the initiator and load module 114, and the post processing module 116. In some examples, the administration profile 118 may provide one or more web components for the migration process. Specifically, the web components may include a login manager component 119, a profile creation component 121, a profile management component 123, and an audit management component 125.

The source ECM repository 120 includes information relating to the source ECM system. As mentioned earlier, the source ECM repository 120 may be a file system, a content management system, a database, or a data warehouse, to name a few examples. In some implementations, the source ECM repository 120 can include the source ECM system itself along with the associated functionalities. Additionally, the source ECM repository 120 further contains functionality related to connecting with users logging in and out of the source ECM repository 120. Specifically, the source ECM repository 120 may receive a session request from the ePME 102 to create an entry point to the source ECM repository 120. In order for the ePME 102 to establish a session with the source ECM repository 120, the ePME 102 can provide information associated with the migration profile to the source ECM repository 120 for credential establishment. Additionally, the source ECM repository 120 may include an indication of where data may be stored in the source ECM database 122. For example, the source ECM repository 120 may include addresses and index representations for the ePME 102 to use for accessing and retrieving documents and process templates in the source ECM database 122. In some implementations, the target ECM repository 126 follows similar functionality to the source ECM repository 120. However, the target ECM repository 126 maintains functionality for the target ECM system whereas the source ECM repository 126 maintains functionality for the source ECM system.

The source ECM database 122 includes information relating to the data associated with the source ECM system. Specifically, the source ECM database 122 can include one or more process templates associated with the source ECM system. A process template can include a process and one or more associated interconnected activities that the source ECM system arranges according to an activity definition or framework. The source ECM system arranges a process, such as email, and one or more associated activities according to a definition or framework. For example, a process such as email, can have one or more associated activities such as forwarding, replying, replying all, scheduling a meeting, inserting a sender in the "To" line, inserting a sender in the "CC" line, inserting a sender in the "BCC" line, and adding a subject line. In the email application, these associated activities are organized in a particular framework. For example, in order for the process of email to occur, the following activity dependencies must occur: a message must exist in the "To" line, a subject line, and message content must be inserted. Therefore, these activities are structurally organized under the process of email. Additionally, other processes may be found in ECM systems such as business management processes, visualization processing tools, and data processing tools, to name a few examples.

Additionally, the source ECM database 122 includes indexed data associated with each of these processes and associated activities. Specifically, the source ECM database 122 holds the data associated with the source ECM system 120's storing and preserving functionality. The source ECM database 122 may store documents, data, metadata, processes, activities, function definitions, user profiles, migration profiles, and source code, associated with the source ECM system. In some implementations, the target ECM database 128 maintains functionality similar to the source ECM database 122. However, the target ECM database 128 maintains functionality for the target ECM system whereas the source ECM database 122 maintains functionality for the source ECM system.

In some implementations, the staging database 124 can be a relational database management system (RDBMS), an XML based database, or a relational database. The staging database 124 stores the information relating to the staging data or staging metadata during the migration process from the source ECM system to the target ECM system. For example, the staging database 124 includes the level 1 staging data and the level 2 staging data. The level 1 staging data and the level 2 staging data will be further described below.

During stage (A), the ePME 102 obtains a login request 101 from client device 106. For example, the client device 106 may send data in the login request 101 that includes credential information associated with user 104. In some implementations, the data in the login request 101 may include a username, password, and a device identification number associated with the client device 106. The client device 106 may send the login request 101 over the network 108 to the ePME 102. The ePME 102 can determine if the credentials in the login request 101 match predetermined credentials. For example, the ePME 102 determines if the received username and password in the login request 101 matches a stored username and password. If a match exists, the ePME 102 allows access to client device 106 and transmits an access granted message to client device 106. Otherwise, the ePME 102 transmits a denied access request message to client device 106 denying entry to the system.

During stage (B), the ePME 102 allows access to client device 106 in response to determining the credentials of the login request 101 were correct. In response to allowing access to client device 106, the ePME 102 obtains an indication from the client device 106 for interacting with a migration profile. For example, the indication from the client device 106 may include a creation of a new migration profile, a selection of a migration profile from a list of previously created migration profiles, or a deletion of a previously created migration profile. In some implementations, the ePME 102 may store the list of previously created migration profiles in memory for quick access and retrieval.

In some implementations, user 104's selection of a migration profile instructs the ePME 102 on how to migrate business processes from a source ECM system to a target ECM system. Specifically, the migration profile instructs the ePME 102 on which process templates, the activities associated with each process, and characteristics associated with each of the activities and processes, to migrate to the target ECM system. In some implementations, should the user 104 send an indication to the ePME 102 to use a migration profile from the list of previously created migration profiles, the number of process templates will have already been selected. In some implementations, user 104 may update the previously created migration profile to change the number of selected process templates. In other implementations, should the user 104 send an indication to the ePME 102 to create a new migration profile, the ePME 102 will present the user 104 with selectable options on client device 106. For example, the selectable options may allow the user 104 to select a number of process templates associated with the source ECM system or allow the user 104 to migrate all of the process templates associated with the source ECM system. In some implementations, the user 104 may select the number of process templates associated with the source ECM system to migrate by interacting with the display of client device 106.

During stage (C), the ePME 102 creates a session in the source ECM repository 120 in response to receiving an indication of a migration profile from the client device 106. Specifically, the analyzer module 112 of the ePME 102 creates the session in the source ECM repository 120. Additionally, the analyzer module 112 stores the user 104 selected migration profile in the source ECM repository 120. For example, the analyzer module 112 may store the selected migration profile and the user 104's selected process templates in the source ECM repository 120 as an XML file. In another example, the analyzer module 112 may store the selected migration profile and the user 104's selected process templates in the source ECM database 122 as a record. In another example, the analyzer module 112 may store the selected migration profile and the user 104's selected process templates in internal memory of the ePME 102.

In some implementations, the analyzer module 112 accesses the list of process templates in the source ECM repository 120 in response to creating a session in the source ECM repository 120. The analyzer module 112 retrieves each of the process templates from the list of process templates in the source ECM repository 120 reflecting a selection of the process templates by user 104. For example, the analyzer module 112 may use one or more API calls to the source ECM repository 120, such as IDF session and IDFProcess for the Documentum ECM system, to retrieve the process templates from the source ECM repository 120. In some implementations, the analyzer module 112 associates the retrieved process templates with the migration profile to keep track of the actions performed by the ePME 102.

During stage (D), the analyzer module 112 queries the source ECM database 122 for the data associated with each of the selected process templates. The analyzer module 112 may use one or more API calls to the source ECM database 122 to retrieve the data associated with each of the selected process templates. In some implementations, the data in the source ECM database 122 may be indexed according to the selected process template name. In other implementations, the data in the source ECM database 122 may be indexed according to the type of selected process template. For example, the selected process template name may be "Purchase Requisition" and the type of the selected process template may be responsible for approving procurement of any device or item within an organization. Additionally, this process template may capture, approve, review, and allow authorized individuals within an organization who are responsible to purchase that item. Other alternatives may be used for the purposes of data indexing in the source ECM database 122.

During stage (E), the analyzer module 112 obtains an object 121 including data that includes one or more activities associated with each of the selected process templates in response to querying the source ECM database 122. In some implementations, the analyzer module 122 then characterizes the data in the obtained object 121. The data can include the details on each process from the selected process template, each of the activities in the selected process templates, and the type of activities. Specifically, the analyzer module 112 classifies each activity in each of the process templates as a manual or an automatic activity. Additionally, the analyzer module 112 determines a connectivity between each of the activities by utilizing a maximum reachability scenario. For example, the analyzer module 112 retrieves 100 activities for a selected process template regarding emailing. Each of the 100 activities may have one or more connections to each other. The analyzer module 112 determines the maximum reachability scenario by identifying how all of the activities are interconnected with one another. For example, the analyzer module 112 determines the maximum reachability scenario by analyzing all of the permutations and combinations between each of the retrieved activities to determine the correct connections.

In some implementations, the analyzer module 112 can determine the performer for each of the activities. For example, the analyzer module 112 classifies each activity as an automatic or manual activity. Continuing with the "Purchase Requisition" example, the analyzer module 112 determines that the activities of reviewing and approval are manual performer activities and the activities of capturing and allowing are automatic activities. The analyzer module 112 determines that the reviewing and approval activities invoke certain tasks, such as email and/or data review, for sending emails for approval reminder and providing summary of data relevant to purchase requisition processes.

During stage (F), the analyzer module 112 creates level 1 stage data from the characterized data in the obtained object 121. In some implementations, the level 1 stage data includes the analyzed data from the obtained object 121 in a table format. For example, the analyzer module 112 organizes the classification for each activity in each of the selected process templates as manual or automatic, the connectivity between each of the activities, the performer for each of the activities, and the user and group identification associated with each manual activity in a table. The analyzer module 112 then stores the table formatted data, as level 1 stage data, in the staging database 124 for further retrieval.

During stage (G), the analyzer module 112 associates the created level 1 stage data with the migration profile. The analyzer module 112 stores a copy of the migration profile with the created level 1 stage data in the staging database 124. The analyzer module 112 can store the migration profile with the created level 1 stage data as a record in the staging database 124 or as an XML file. Additionally, the migration profile may include a status indicating to the analyzer module 112 where the ePME 102 is in the migration process, as indicated by the analyzer module 112. For example, the analyzer module 112 may include a status of "YET_TO_BEGIN" in the status of the migration profile when the level 1 staging data is stored in the staging database 124.

Figure 1B:
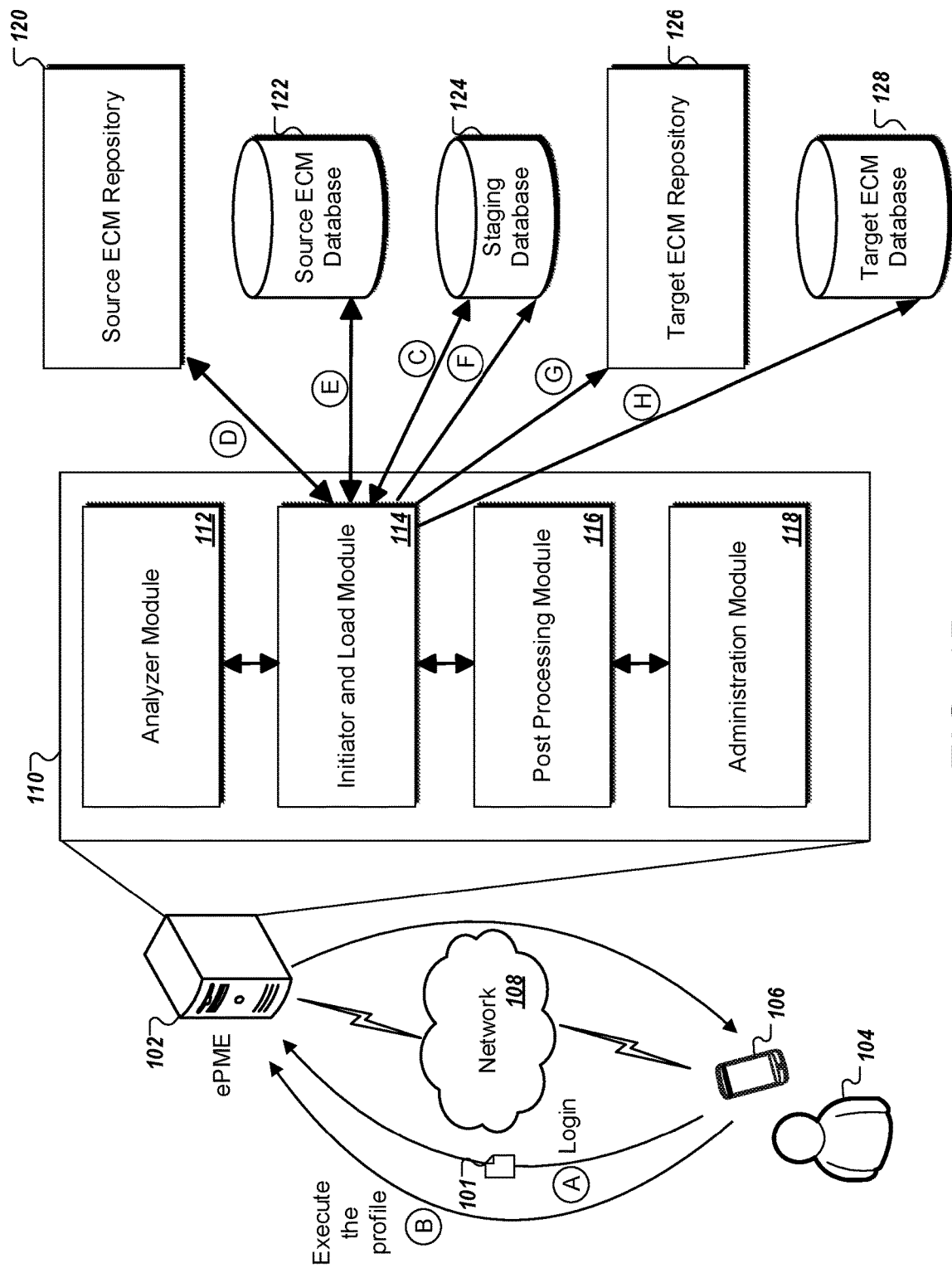

FIG. 1B is a block diagram that illustrates an example of a system 100 for an automatic ECM process migrator. FIG. 1B illustrates substantially similar components to FIG. 1A. FIG. 1B illustrates various operations in stages (A) through (G) which can be performed in the sequence indicated or in another sequence.

During stage (A), the ePME 102 obtains a login request 101 from client device 106. The login request 101 can be the same login request 101 from stage (A) of FIG. 1A. In some implementations, user 104 may log out following the initiation of stage (B) from FIG. 1A. This is because the process of stages (B) through (G) from FIG. 1A may take a long time. For example, the process of stages (B) through (G) from FIG. 1A may take 20 days or longer to perform and the user 104 may log in once that process is complete. In some implementations, the user 104 may receive a notification on client device 106 from the ePME 102 indicating a completion of level 1 stage data. For example, the ePME 102 may transmit a message to the client device 102 that displays "LEVEL 1 STAGE DATA COMPLETE."

During stage (B), the ePME 102 allows access to client device 106 in response to determining the credentials of the login request 101 were correct. In response to allowing access to client device 106, the ePME 102 obtains a selection from the client device 106 for executing the migration profile associated with the recently completed level 1 staging data. In some implementations, the ePME 102 executes the next steps in the migration process from the source ECM system to the target ECM system in response to receiving the selection from the client device 106. In other implementations, stages (A) and (B) of FIG. 1B may be optional stages because the ePME 102 may automatically execute the migration process in the migration profile following the completion of the level 1 stage data.

During stage (C), the initiator and load module 114 can retrieve the migration profile data from the staging database 124. In some implementations, the initiator and load module 114 retrieves the migration profile and associated level 1 stage data from the staging data 124. For example, the initiator and load module 114 retrieves the migration profile and the level 1 stage data including the process template ID, the process template name, each of the activity names, each of the activity types, the performer for each activity, the type of each performer, a name of a source activity, a name of a target activity, and connectivity types.

During stage (D), the initiator and load module 114 queries the source ECM repository 120. In some implementations, the initiator and load module 114 retrieves a process template definition from the source ECM repository 120. Stage (D) is similar to stage (C) from FIG. 1A. In some implementations, the initiator and load module 114 retrieves the process templates associated with the migration profile from the source ECM repository 120.

During stage (E), the initiator and load module 114 queries the source ECM database 122 for the data associated with each of the selected templates. Stage (E) is similar to stage (D) from FIG. 1A. In some implementations, stage (E) is performed a second time to create level 2 staging data from the level 1 staging data and the retrieved data associated with each of the selected templates.

During stage (F), the initiator and load module 114 creates level 2 stage data from the level 1 staging data and the retrieved data associated with each of the selected templates. In some implementations, the level 2 stage data includes the process profile ID, the process name, the activity name, the activity type, the activity performer, the type of performer, the source activity, the target activity, and the connectivity type from the level 1 staging area. For example, the initiator and load module 114 retrieves a process profile ID of "000000001", a process name of "Process Automation," an activity name of "Initiate," an activity type of "Manual" an activity performer of "User 1," a type of the performer as "User", a source activity of "Act 1," a target activity of "Act 2," and a connectivity type from the level 1 staging data as "Forward."

In some implementations, the initiator and load module 114 may further analyze the characteristics of each process. For example, the "Process Automation" process may include three source activities—"Activity 1," "Activity 2," and "Activity 3." Additionally, each source activity migrates to a target activity stored in the level 2 staging area. For example, "Activity 1" migrates to "Activity 3," "Activity 2" migrates to "Activity 4," and "Activity 3" migrates to "End Activity." The "Process Automation" can further define a priority of each activity. Such as, for example, "Activity 2" has a rank of 1, "Activity 1" has a rank of 2, and "Activity 3" has a rank of 3 in order of importance. In some implementations, the initiator and load module 114 may further analyze the number of connections for each activity. For example, an activity such as "Activity 1" may have multiple connections to various activities, such as "Activity 2," "Activity 3," and "Activity 4." The connection type between activities can be further defined. For example, "Activity 1" may receive input from "Activity 2." Additionally, "Activity 1" may output data to "Activity 3" and "Activity 4." Additionally, the "Process Automation" can further define a port associated with each activity. For example, "Activity 1" may be connected on a source port 0 of the "Process Automation", "Activity 2" may be connected on a source port 1 of the "Process Automation", and "Activity 3" may be connected on a source port 2 of the "Process Automation." Likewise, the "Activity 1" may be connected on a target port 1 of the "Process Automation", "Activity 2" may be connected on a target port 3 of the "Process Automation", and "Activity 3" may be connected on a target port 0 of the "Process Automation." The ports describe how activities, such as manual and automatic activities, are connected with each other for a specific source ECM system, such as Documentum. This will facilitate how the processes will be migrated from the source activity to the target activity in the level 2 staging data. The initiator and load module 114 then stores the accumulated level 2 staging data in the staging database 124 for further retrieval. Additionally, the initiator and load module 114 updates the migration profile with the accumulated level 2 staging data and stores the migration profile in the staging database 124.

In some implementations, the creation process of the level 2 staging data and storing of the migration profile and accumulated level 2 staging data may take a long time. For example, creation of level 2 staging data may take 20 days or longer to perform. The reason for the length of time is the size of the level 2 staging data may be upwards of terabytes in size. In some implementations, the user 104 may receive a notification on client device 106 from the ePME 102 indicating a completion of level 2 stage data. For example, the ePME 102 may transmit a message to the client device 102 that displays "LEVEL 2 STAGE DATA COMPLETE."

During stage (G), the initiator and load module 114 retrieves the migration profile data from the staging database 124. In some implementations, the initiator and load module 114 retrieves the migration profile and associated level 1 and level 2 stage data from the staging data 124. For example, the initiator and load module 114 retrieves the migration profile, the level 1 stage data including the process template ID, the process template name, each of the activity names, each of the activity types, the performer for each activity, the type of each performer, a name of a source activity, a name of a target activity, and connectivity types, and the level 2 stage data includes additional information such as the source activity, the target activity, and the connectivity type from the level 1 staging area.

In some implementations, the target ECM repository 126 may receive a session request from the initiator and load module 114 to create an entry point to the target ECM repository 126. In order for the ePME 102 to establish a session with the target ECM repository 126, the ePME 102 can provide information associated with the migration profile to the target ECM repository 126 for credential establishment. Additionally, the target ECM repository 126 may include an indication of where data may be stored in the target ECM database 122. For example, the target ECM repository 126 may include addresses and index representations for the initiator and load module 114 to retrieve for storing documents and process templates in the target ECM database 128.

In some implementations, the initiator and load module 114 creates processes, activities, and connections in between each of the activities from the level 1 stage data and the level 2 stage data. Specifically, the initiator and load module 114 accesses the level 1 stage data and the level 2 stage data, retrieves all of the activities for a process ID, and generates the process associated with the process ID and each of the activities in the target ECM repository 126. For example, the initiator and load module 114 creates the process, activity, type of activity, performer, the performer type, the source activity, and the target activity in the target ECM repository 126. In some implementations, the initiator and load module 114 performs this creation step in the target ECM repository 126 for each process ID in the level 1 and level 2 stage data.

During stage (H), the initiator and load module 114 stores any data associated with each of the processes and associated activities, now created in the target ECM repository 126, in the target ECM database 128. As mentioned above, the target ECM database 128, like the source ECM database 122, stores and preserves the data associated with the processes and activities in the target ECM repository 126. The target ECM database 128 may store documents, data, metadata, processes, activities, function definitions, user profiles, migration profiles, and source code, associated with the target ECM system from the target ECM repository 126. In some implementations, the newly generated data in the target ECM repository 126 and the target ECM database 128 represent the result of the migration process from the source ECM system to the target ECM system. At this point in the migration process, the migration from source ECM system to the target ECM system is complete.

Figure 1C:
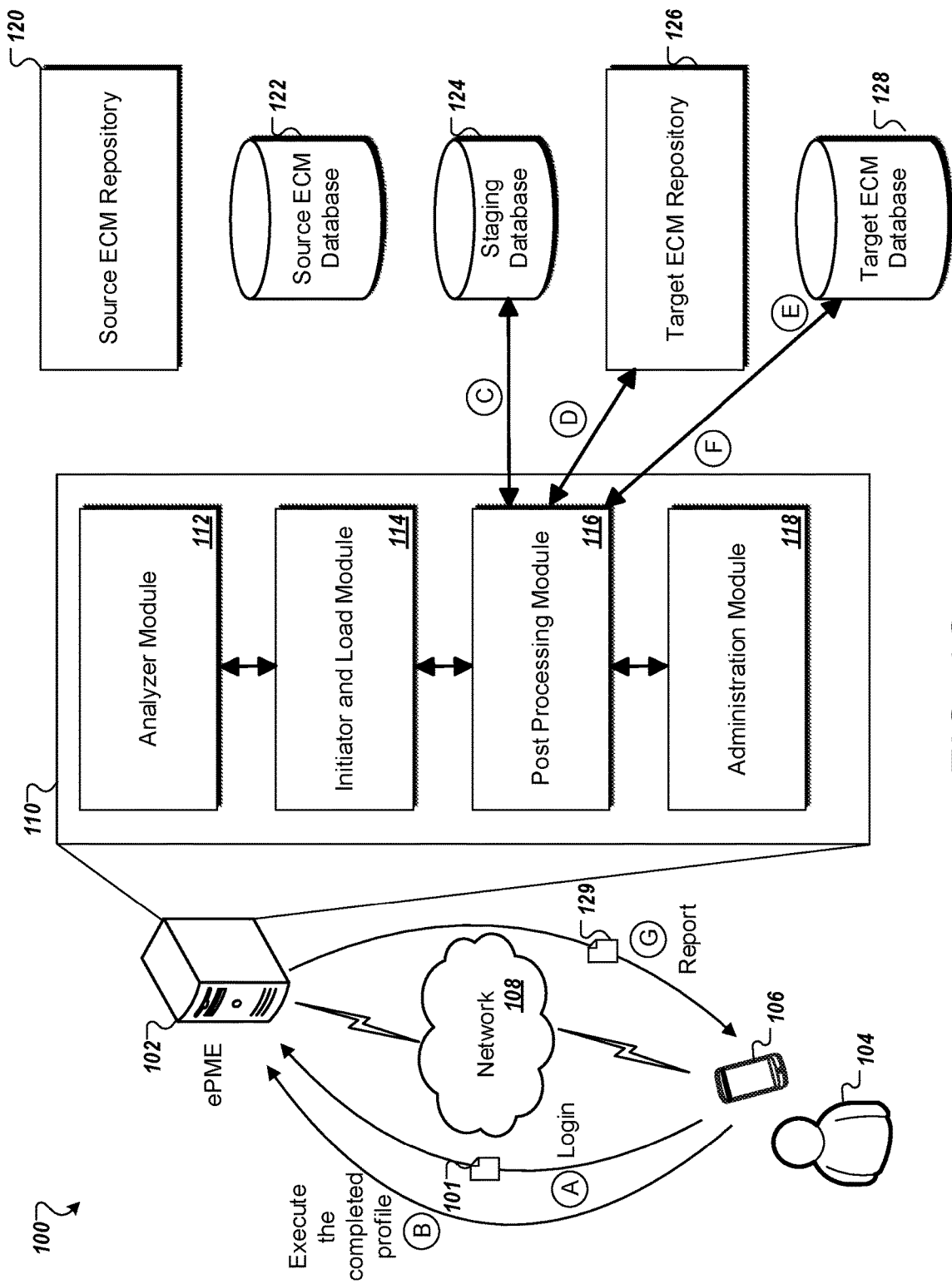

FIG. 1C is a block diagram that illustrates an example of a system 100 for an automatic ECM process migrator. FIG. 1C illustrates substantially similar components to FIGS. 1A and 1B. FIG. 1C illustrates various operations in stages (A) through (G) which can be performed in the sequence indicated or in another sequence.

During stage (A), the ePME 102 obtains a login request 101 from client device 106. The login request 101 can be the same login request 101 from stage (A) of FIG. 1A. In some implementations, user 104 may log out following the initiation of stage (A) of FIG. 1B. This is because the process of stages (B) through (H) from FIG. 1B may take a long time. For example, the process of stages (B) through (H) from FIG. 1B may take 20 days or longer to perform and the user 104 may log in once that process is complete. In some implementations, the user 104 may receive a notification on client device 106 from the ePME 102 indicating a completion of the migration process. For example, the ePME 102 may transmit a message to the client device 102 that displays "PROCESS OF MIGRATION SOURCE ECM TO TARGET ECM COMPLETE."

During stage (B), the ePME 102 allows access to client device 106 in response to determining the credentials of the login request 101 were correct. In response to allowing access to client device 106, the ePME 102 obtains a selection from the client device 106 for executing a recently completed migration profile. In some implementations, the post processing module 116 executes the migration process again from the steps of the completed migration profile to find and correct any errors associated with the steps of the completed migration profile.

During stage (C), the post processing module 116 can retrieve the completed migration profile data from the staging database 124. In some implementations, the post processing module 116 retrieves the completed migration profile and level 1 and level 2 stage data from the staging database 124. In some implementations, the post processing module 116 executes the completed migration profile to ensure the completed migration process from the source ECM system to the target ECM system executed with no errors. If errors occurred, the post processing module 116 can find and correct the errors. Specifically, errors may occur in any location during the migration process. In some implementations, the post processing module 116 reruns the migration process only on the erred instances from the previous migration process. The retrieved migration profile includes each of the transactions and data that took place during the migration process. The post processing module 116 can traverse the migration profile to determine if any errors occurred by noting of crashed results. For example, the post processing module 116 may note segmentation faults in the migration profile, failure to launch the target ECM system, and failure to execute one or more processes or activities associated with the target ECM system, to name a few.

During stage (D), the post processing module 116 queries the target ECM repository 126. In some implementations, the post processing module 114 retrieves the migrated process template definitions from the target ECM repository 126 as defined in the migration profile. Stage (D) is similar in functionality to stage (C) from FIG. 1A and to stage (D) from FIG. 1B, except applied to the target ECM repository 126 rather than source ECM repository 120. In some implementations, the post processing module 116 retrieves the process templates associated with the migration profile from the target ECM repository 126.

During stage (E), the post processing module 116 queries the target ECM database 128 for the process templates data associated with each of the selected process templates. The analyzer module 112 may use one or more API calls to the target ECM database 128 to retrieve the process templates data associated with each of the selected process templates. In some implementations, the data in the target ECM database 128 may be indexed according to the selected process template name. In other implementations, the data in the target ECM database 128 may be indexed according to the type of selected process template. For example, the selected process template name may be "Internet Explorer" and the type of the selected process template may be "Browser." Other alternatives may be used for the purposes of data indexing in the target ECM database 122.

During stage (F), the post processing module 116 may perform tests to validate the process templates data retrieved from the target ECM database 128. In some implementations, the post processing module 116 may traverse the process templates data from the target ECM database 128 and analyze each activity in the process templates data. For example, the post processing module 116 may analyze the characteristics associated with each activity, such as the activity types, the performer for each activity, the type of each performer, a name of a source activity, a name of a target activity, and the connectivity types. In addition, the post processing module 116 may compare the data from the level 1 and level 2 stage data to the analyzed data from the process templates data retrieved from the target database 128. For example, the post processing module 116 may traverse each row of the level 1 and level 2 database. The post processing module 116 may compare the activity types, the performer for each activity, the type of each performer, a name of a source activity, a name of a target activity, and the connectivity types in the level 1 and level 2 stage data to the same data in the process templates data retrieved from the target database 128.

In some implementations, the post processing module 116 generates a validation report 129 to provide to user 104. In particular, the validation report 129 includes a report of whether the migration process was successful. In addition, the validation report includes details regarding one or more errors if the migration process was unsuccessful. For example, during the post processing module 116's comparison between the level 1 and level 2 stage data to the data in the process templates data, should the post processing module 116 note any errors in the comparison, the post processing module 116 will add that detail in the validation report. For example, for a profile ID of 000000001, the post processing module 116 may determine the performer for "Activity 1" is different between the level 1 and level 2 stage data and the data in the process templates data. The performer may be "User" in the level 1 and level 2 stage data, whereas the performer may be "N/A" for the process templates data.

During stage (G), the post processing module 116 may provide the validation report 129 to the client device 106 over the network 108. In some implementations, the user 104 may rerun the migration process to fix any errors found in the provided validation report 129. In other implementations, the client device 106 may access the target ECM repository 126 and the target ECM database 128 to manually change the errors found in the provided validation report 129.

FIG. 1D is a block diagram that illustrates an example of a system 100 for an automatic ECM process migrator. FIG. 1D illustrates substantially similar components to FIGS. 1A, 1B, and 1C.

The administration module 118 is further illustrated in FIG. 1D. In some implementations, the administration module 118 provides a set of web components that act as user interfaces for user 104 on client device 106 for managing, extracting, and ingesting migration profiles. For example, the administration module 118 includes a login manager component 119, a profile creation component 121, a profile management component 123, and an audit management component 125. Each of these web components connect with and instruct the analyzer module 112, the initiator and load module 114, and the post processing module 116.

In some implementations, the web components interactively display profile options to user 104 to interact with on client device 106. For example, the login manager component 119 may include a login GUI for user 104 to enter his or her credentials to access the ePME 102. The profile creation component 121 may include a GUI for user 104 to select a migration profile from a list of migration profiles. Additionally, the profile creation component 121 may include a GUI for user 104 to create a migration profile that is not a part of the list of migration profiles. Additionally, the profile creation component 121 may include a GUI for user 104 to select a predefined list of process templates from a list of process templates. The profile management component 123 may include a GUI for user 104 to manage a currently executing migration profile. The profile management component 123 may allow a user 104 to receive messages regarding the status of the migration process, such as "LEVEL 1 STAGE DATA COMPLETE," "LEVEL 2 STAGE DATA COMPLETE," and "PROCESS OF MIGRATION SOURCE ECM TO TARGET ECM COMPLETE." The audit management component 125 may include a GUI for user 104 to view and interact with the validation report 129.

Figure 2:
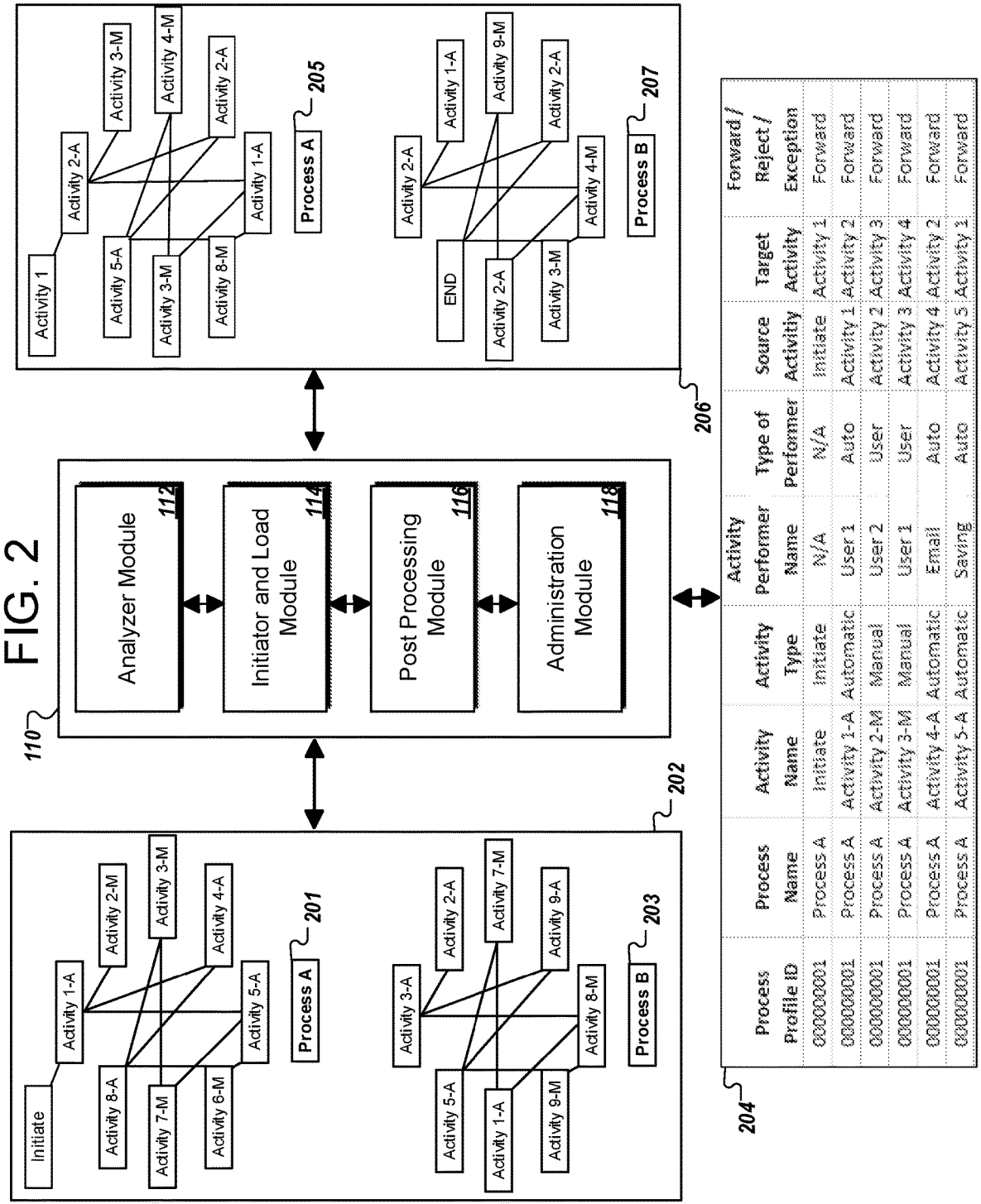
FIG. 2 is a block diagram that illustrates an example of multiple processes migrated by an automated ECM process migrator.

FIG. 2 is a block diagram that illustrates an example of multiple processes migrated by an automated ECM process migrator. In some implementations, FIG. 2 illustrates a visual depiction of the processes illustrated by FIGS. 1A through 1D. Specifically, the process shown in FIG. 2 illustrates the functions performed by the analyzer module 112, the initiator and load module 114, and the post processing module 116.

In some implementations, the source processes 202 included processes in the source ECM system. Specifically, the source processes 202 include process template A 201 and process template B 203. Process template A 201 includes the following activities—"Initiate," "Activity 1-A," "Activity 2-M," "Activity 3-M," "Activity 4-A," "Activity 5-A," "Activity 6-M," "Activity 7-M," and "Activity 8-A." Additionally, process template B 203 includes the following activities—"Activity 3-A," "Activity 2-A," "Activity 7-M," "Activity 9-A," "Activity 8-M," "Activity 9-M," "Activity 1-A," and "Activity 5-A." In some implementations, each of the activities in process template A 201 and process template B 203 may be respectively connected with one another as shown by the lines drawn between the activities associated with each process. For example, in process template A 201 "Activity 8-A" may connect with "Activity 3-M," "Activity 4-A," and "Activity 6-M."

In some implementations, the internal components 110 of the ePME 102 may be used to characterize the process template A 201 and the process template B 203. As described by the stages in FIGS. 1A through 1D, the internal components 110 of the ePME 102 can migrate the source processes 202 to the target processes 206. The target processes 206 includes the process template A 205 and the process template B 207. In order for the migration process to occur, the internal components 110 of the ePME 102 creates staging data 204 for migrating the source processes 202 to the target processes 206. In some implementations, the staging data 204 include level 1 and level 2 staging data such as process profile ID, a process name, an activity name, an activity type, an activity performer name, a type of performer, a source activity, a target activity, and a forward/reject/exception connectivity. As can be seen in the staging data 204, the first row of the staging data 204 includes an activity of "Initiate." The activity "Initiate" can be seen in process template A 201. The staging data 204 is used by the internal components 110 of the ePME 102 to migrate the "Initiate" source activity in the source processes 202 to the "Activity 1" target activity in the target process 206. In order for the internal components 110 of the ePME 102 to determine whether an activity from the source process 202 is to be migrated over to the target process 206, the internal components 110 of the ePME 102 read the forward/reject/exception column. Specifically, if an item in the forward/reject/exception column displays "Forward", as seen by the rows of the staging data 204, then the associated source activity is migrated to the target activity 206. This can be seen in the activities shown in the process template A 205. For example, the source activity 2-M and 3-M, which have a target activity of 3 and 4, respectively, are seen as activities 3-M and 4-M, respectively, in the activities shown in the process template A 205. This process continues for each row item traversed in the staging data 204.

Figure 3:
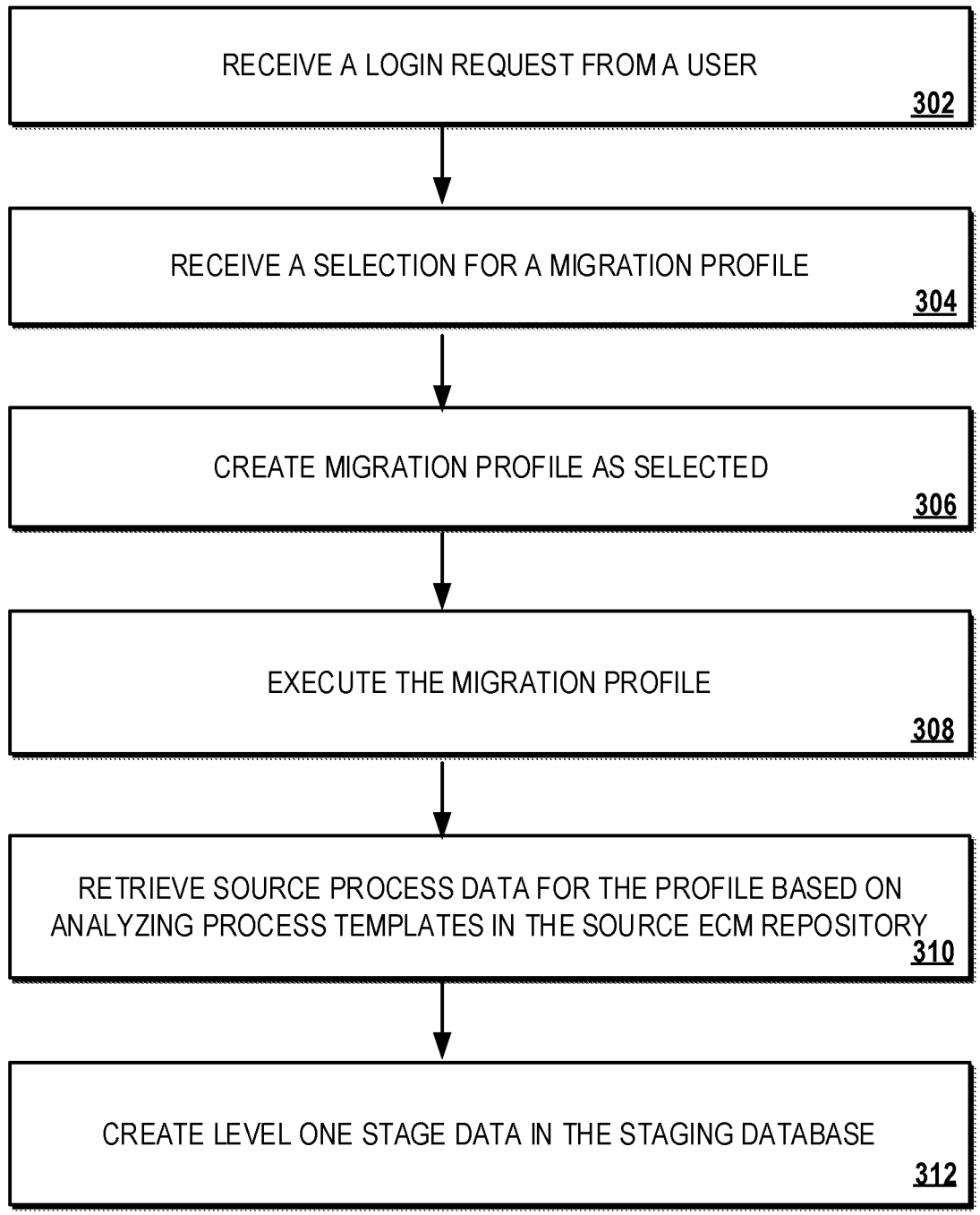
FIG. 3 is a flowchart of example processes for automating an ECM process migration.

FIG. 3 is a flowchart of an example process 300 for automating an ECM process migration. For convenience, the process 300 will be described as being performed by a system of one or more computers, located in one or more locations, and programmed appropriately in accordance with this specification. For example, a system, e.g., the system 100 of FIG. 1A, appropriately programmed, can perform the process 300.

During 302, the ePME 102 obtains a login request 101 from client device 106. For example, the client device 106 may send data in the login request 101 that includes credential information associated with user 104. In some implementations, the data in the login request 101 may include a username, password, and a device identification number associated with the client device 106. The client device 106 may send the login request 101 over the network 108 to the ePME 102. The ePME 102 can determine if the credentials in the login request 101 match predetermined credentials. The ePME 102 allows client device 106 to access the ePME 102 and transmits an access granted message to client device 106.

During 304, the ePME 102 obtains an indication from the client device 106 for interacting with a migration profile. For example, the indication from the client device 106 may include a creation of a new migration profile, a selection of a migration profile from a list of previously created migration profiles, or a deletion of a previously created migration profile. In some implementations, user 104's selection of a migration profile instructs the ePME 102 on how to migrate a source ECM system to a target ECM system.

During 306, the ePME 102 creates the migration profile as selected per the user 104's request. For example, the ePME 102 creates the migration profile by presenting the user 104 with selectable options on client device 106. For example, the selectable options may allow the user 104 to select a number of process templates associated with the source ECM system or allow the user 104 to migrate all of the process templates associated with the source ECM system. In some implementations, the user 104 may select the number of process templates associated with the source ECM system to migrate by interacting with the display of client device 106.

During 308, the ePME 102 executes the selected migration profile. In some implementations, executing the migration profile creates a session in the source ECM repository 120 by the analyzer module 112 to begin the migration. Additionally, the analyzer module 112 stores the user 104 selected migration profile in the source ECM repository 120.

During 310, the analyzer module 112 accesses the list of process templates in the source ECM repository 120 in response to creating a session in the source ECM repository 120. The analyzer module 112 retrieves each of the process templates from the list of process templates in the source ECM repository 120 reflecting a selection of the process templates by user 104. In addition, the analyzer module 114 transmits a query to the source ECM database 122 for the data associated with each of the selected process templates. In some implementations, the analyzer module 112 obtains an object 121 including data that includes one or more activities associated with each of the selected process templates in response to querying the source ECM database 122. In some implementations, the analyzer module 122 then characterizes the data in the obtained object 121. The data can include the details on each process from the selected process template, each of the activities in the selected process templates, and the type of activities.

During 312, the analyzer module 112 creates level 1 stage data from the characterized data in the obtained object 121. In some implementations, the level 1 stage data includes the analyzed data from the obtained object 121 in a table format. The analyzer module 112 then stores the table formatted data, as level 1 stage data, in the staging database 124 for further retrieval. In some implementations, the analyzer module 112 stores a copy of the migration profile with the created level 1 stage data in the staging database 124.

Figure 4:
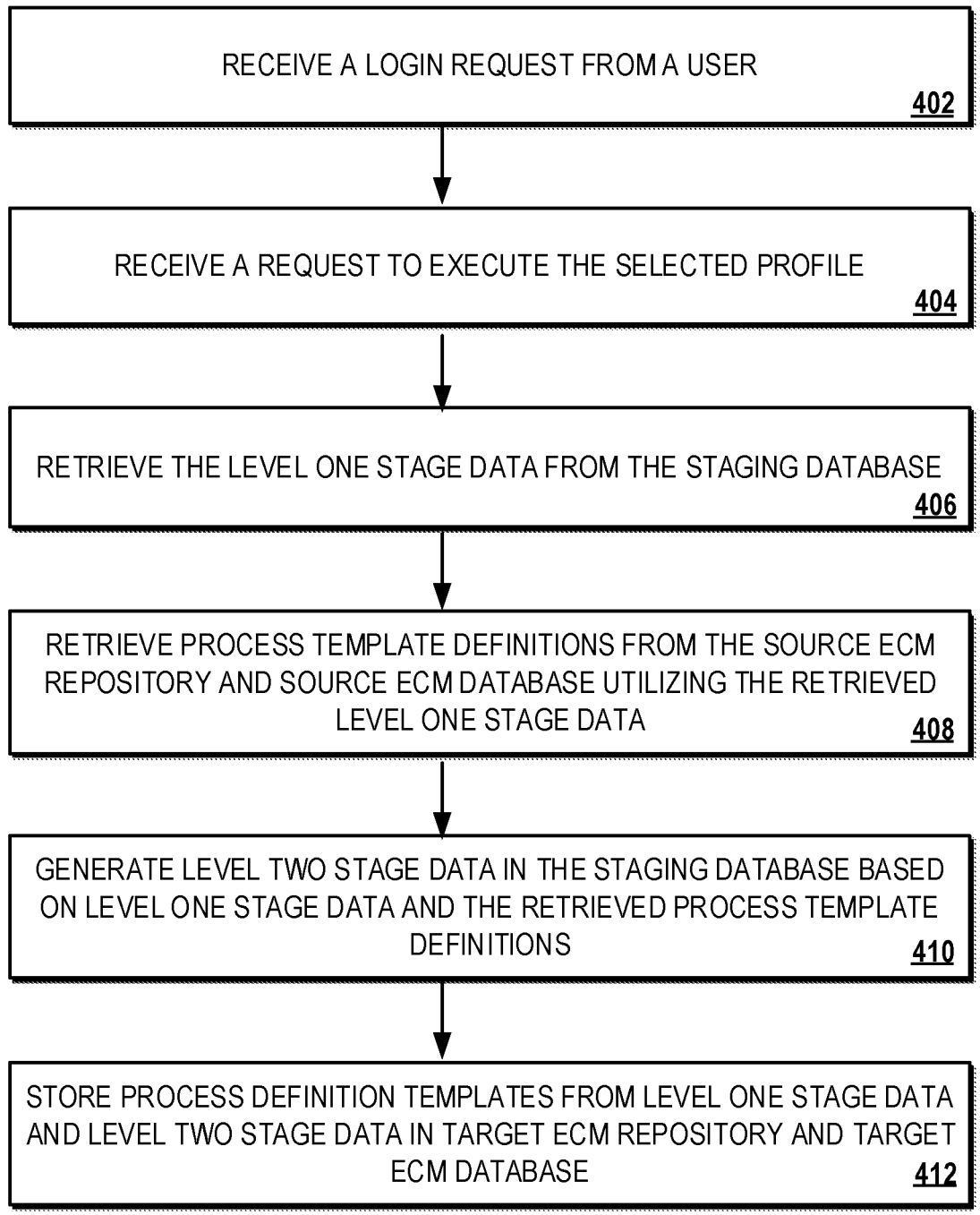
FIG. 4 is a flowchart of example processes for automating an ECM process migration.

FIG. 4 is a flowchart of an example process 400 for automating an ECM process migration. For convenience, the process 400 will be described as being performed by a system of one or more computers, located in one or more locations, and programmed appropriately in accordance with this specification. For example, a system, e.g., the system 100 of FIG. 1B, appropriately programmed, can perform the process 400.

During 402, the ePME 102 obtains a login request 101 from client device 106. 402 is similar to the processes described in 302.

During 404, the ePME 102 allows access to client device 106 in response to determining the credentials of the login request 101 were correct. In response to allowing access to client device 106, the ePME 102 obtains a selection from the client device 106 for executing the migration profile associated with the recently completed level 1 staging data. In some implementations, the ePME 102 executes the next steps in the migration process from the source ECM system to the target ECM system in response to receiving the selection from the client device 106.

During 406, the initiator and load module 114 can retrieve the migration profile data from the staging database 124. In some implementations, the initiator and load module 114 retrieves the migration profile and associated level 1 stage data from the staging data 124. For example, the initiator and load module 114 retrieves the migration profile and the level 1 stage data including the process template ID, the process template name, each of the activity names, each of the activity types, the performer for each activity, the type of each performer, a name of a source activity, a name of a target activity, and connectivity types.

During 408, the initiator and load module 114 queries the source ECM repository 120. In some implementations, the initiator and load module 114 retrieves a process template definition from the source ECM repository 120. 408 is similar to the processes described in 310.

During 410, the initiator and load module 114 creates level 2 stage data from the level 1 staging data and the retrieved data associated with each of the selected templates. In some implementations, the level 2 stage data includes the process profile ID, the process name, the activity name, the activity type, the activity performer, the type of performer, the source activity, the target activity, and the connectivity type from the level 1 staging area. In some implementations, the initiator and load module 114 may further analyze the characteristics of each process. In some implementations, the target ECM repository 126 may receive a session request from the initiator and load module 114 to create an entry point to the target ECM repository 126. In order for the ePME 102 to establish a session with the target ECM repository 126, the ePME 102 can provide information associated with the migration profile to the target ECM repository 126 for credential establishment. In some implementations, the initiator and load module 114 creates processes, activities, and connections in between each of the activities from the level 1 stage data and the level 2 stage data. Specifically, the initiator and load module 114 access the level 1 stage data and the level 2 stage data, retrieves all of the activities for a process ID, and generates the process associated with the process ID and each of the activities in the target ECM repository 126.

During 412, the initiator and load module 114 creates this data in the target ECM repository 126 for each process ID in the level 1 and level 2 stage data. Specifically, the initiator and load module 114 access the level 1 stage data and the level 2 stage data, retrieves all of the activities for a process ID, and generates the process associated with the process ID and each of the activities in the target ECM repository 126. In some implementations, the initiator and load module 114 stores any data associated with each of the processes and associated activities, now created in the target ECM repository 126, in the target ECM database 128. As mentioned above, the target ECM database 128, like the source ECM database 122, stores and preserves the data associated with the processes and activities in the target ECM repository 126.

Figure 5:
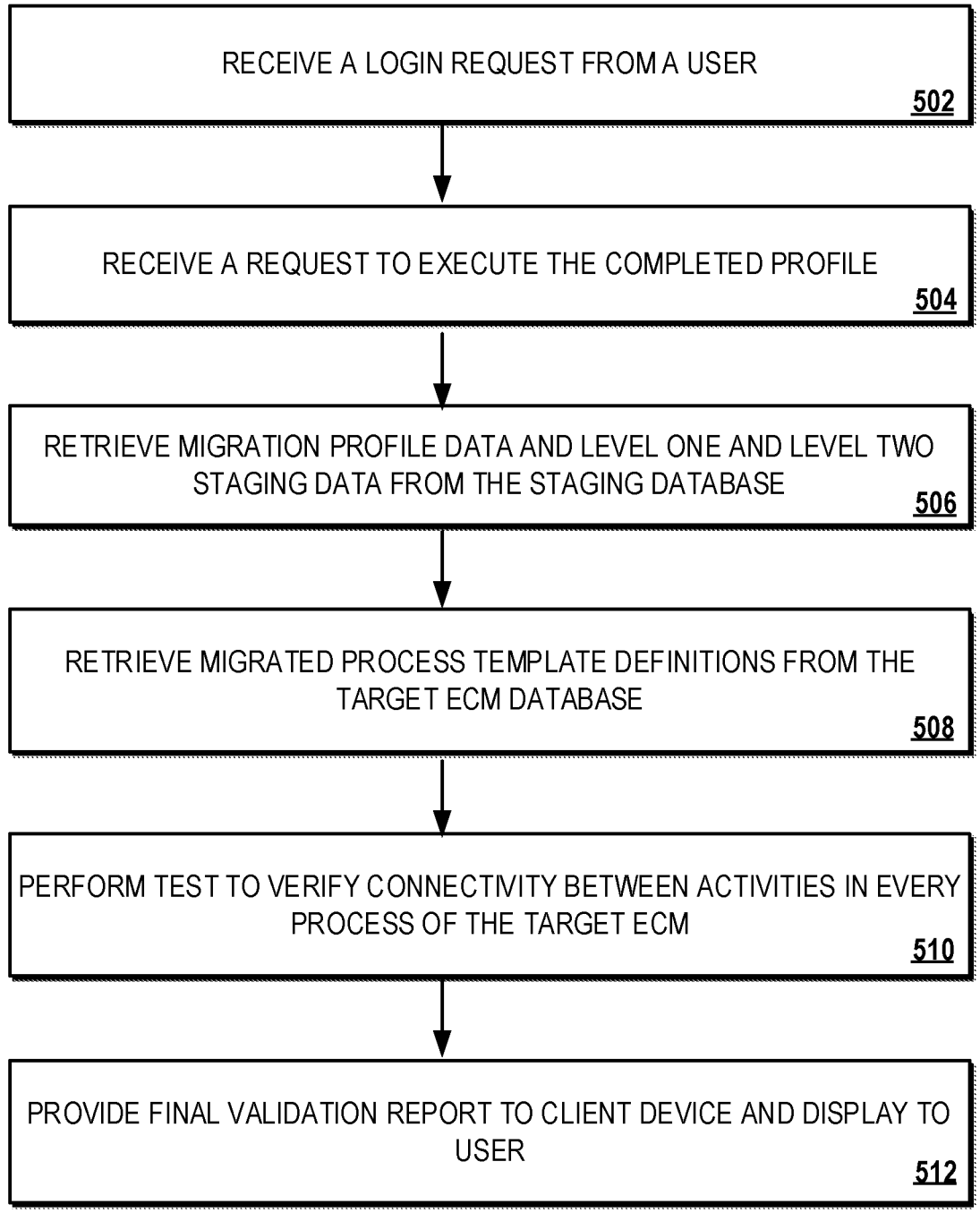
FIG. 5 is a flowchart of example processes for automating an ecm process migration.
Figure 6:
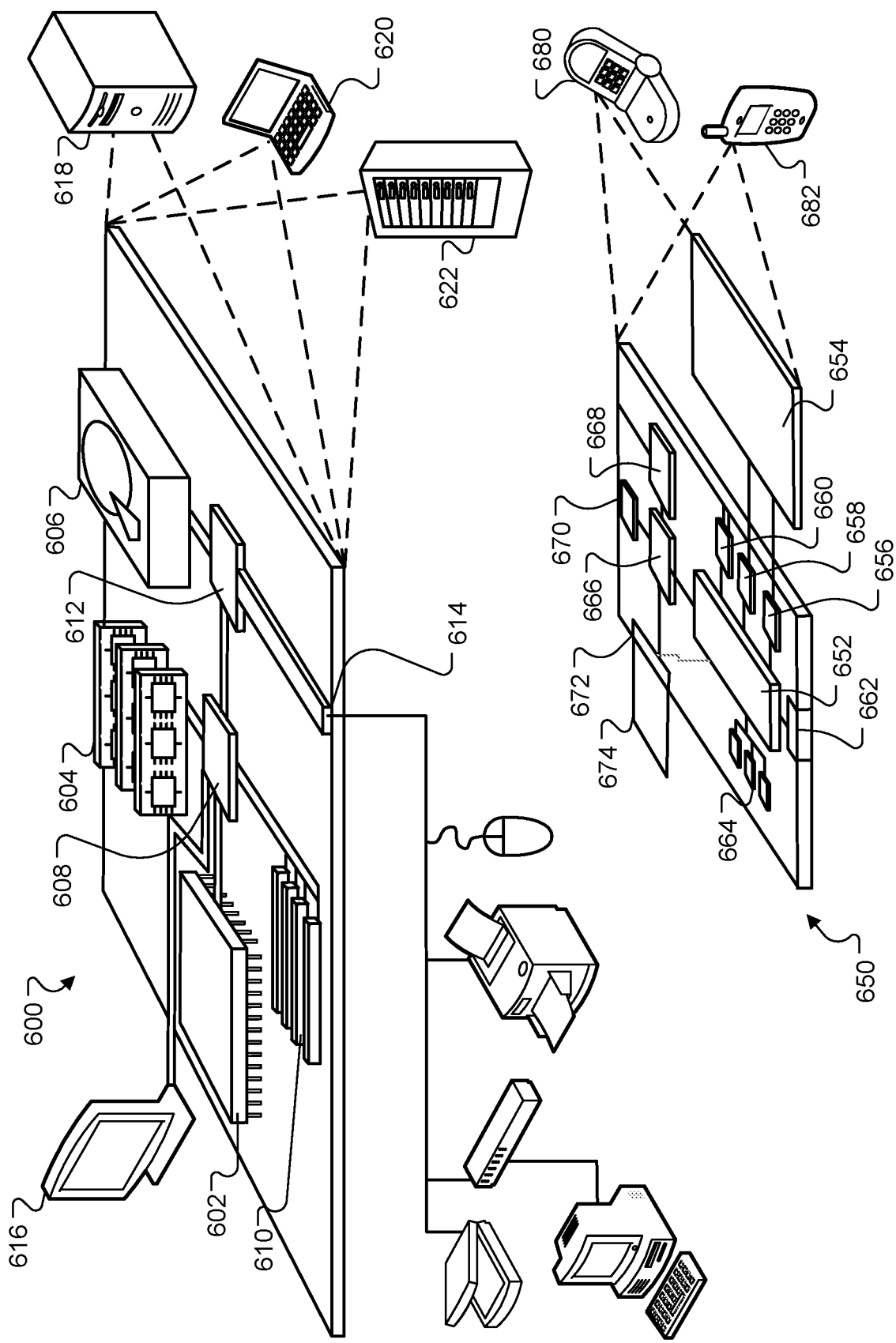
FIG. 6 shows an example of a computing device and a mobile computing device.

FIG. 5 is a flowchart of an example process 500 for automating an ECM process migration. For convenience, the process 500 will be described as being performed by a system of one or more computers, located in one or more locations, and programmed appropriately in accordance with this specification. For example, a system, e.g., the system 100 of FIG. 1C, appropriately programmed, can perform the process 500.

During 502, the ePME 102 obtains a login request 101 from client device 106. 502 is similar to the processes described in 402 and 302.

During 504, the ePME 102 allows access to client device 106 in response to determining the credentials of the login request 101 were correct. In response to allowing access to client device 106, the ePME 102 obtains a selection from the client device 106 for executing a recently completed migration profile. In some implementations, the post processing module 116 executes the migration process again from the steps of the completed migration profile to find and correct any errors associated with the steps of the completed migration profile.

During 506, the post processing module 116 can retrieve the completed migration profile data from the staging database 124. In some implementations, the post processing module 116 retrieves the completed migration profile and level 1 and level 2 stage data from the staging database 124. The retrieved migration profile includes each of the transactions and data that took place during the migration process. The post processing module 116 can traverse the migration profile to determine if any errors occurred by noting of crashed results.

During 508, the post processing module 116 queries the target ECM repository 126. In some implementations, the post processing module 114 retrieves the migrated process template definitions from the target ECM repository 126 as defined in the migration profile. Additionally, the post processing module 116 queries the target ECM database 128 for the process templates data associated with each of the selected process templates. The analyzer module 112 may use one or more API calls to the target ECM database 128 to retrieve the process templates data associated with each of the selected process templates.

During 510, the post processing module 116 may perform tests to validate the process templates data retrieved from the target ECM database 128. In some implementations, the post processing module 116 may traverse the process templates data from the target ECM database 128 and analyze each activity in the process templates data. In addition, the post processing module 116 may compare the data from the level 1 and level 2 stage data to the analyzed data from the process templates data retrieved from the target database 128. The post processing module 116 may compare the activity types, the performer for each activity, the type of each performer, a name of a source activity, a name of a target activity, and the connectivity types in the level 1 and level 2 stage data to the same data in the process templates data retrieved from the target database 128.

During 512, the post processing module 116 generates a validation report 129 to provide to user 104 on the client device 106 over the network 108. In particular, the validation report 129 includes a report of whether the migration process was successful. In addition, the validation report includes details regarding one or more inconsistencies if the migration process was unsuccessful. In some implementations, the user 104 may rerun the migration process to fix any errors found in the provided validation report 129.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. For example, the migration process may be performed using a multitasking/multi-threaded approach. In this example, for a migration of five separate business process templates, five separate threads may be used in parallel to migrate each business process template from a source ECM system to a target ECM system, which saves time and improves efficiency.

What is claimed is:

1. A computer-implemented method comprising:
    generating, by an enterprise content management process migration engine (ePME), a migration profile for migrating data from a first enterprise content management (ECM) system to a second ECM system in response to receiving a request from a user to initiate a migration;
    determining, by the ePME, content to extract associated with a process template from the first ECM system, wherein the process template defines an activity framework of at least one process and at least one activity associated with the at least one process;
    identifying, by the ePME, at least one process and at least one activity associated with the at least one process in the process template;

determining, by the ePME, at least one classification associated with the at least one process activity in the process template;

generating, by the ePME, a second ECM system architecture having an activity framework in the second ECM system that matches a first ECM system architecture of the activity framework in the first ECM system;

generating, by the ePME, a database in the second ECM system storing the second ECM system architecture, wherein the second ECM system architecture comprises each of the at least one process, the at least one activity, and the associated at least one classification from the process template; and validating, by the ePME, a successful transaction between the first ECM system and the second ECM system.

2. The computer method of claim 1, further comprising:
in response to storing the at least one process activity and the at least one associated classification from the process template, auditing, by the ePME, at least one event associated with the migrating data in the migration profile.

3. The computer method of claim 1, wherein the at least one classification comprises a process profile ID, a process name, an activity name, an activity type, an activity performer, a type of performer, a source activity, a target activity, and a connectivity type.

4. The computer method of claim 1, further comprising:
in response to validating the successful transaction as unsuccessful, retrieving the migration profile and executing the migration profile to correct the unsuccessful transaction.

5. The computer method of claim 1, comprising:
storing, by the ePME, the database in the second ECM system with the migration profile in response to generating the database in the second ECM system.

6. The computer method of claim 1, wherein determining the process template associated with extraction of content from the first ECM system further comprises:
receiving, by the ePME, a selection of the process template from a client device in response to providing a list of process templates to the client device.

7. The computer method of claim 2, further comprising:
providing, by the ePME, at least one notification to a client device in response to the at least one event associated with the migrating data in the migration profile.

8. The computer method of claim 1, wherein validating the successful transaction between the first ECM system and the second ECM system the further comprises:
comparing, by the ePME, the data in the second ECM system to staging data indicating the at least one process and the least one activity associated with the at least one process associated with the process template in the first ECM system; and
generating, by the ePME, a summary report that comprises the successful transaction in response to determining a match between the data in the second ECM system to the staging data.

9. A system comprising:
one or more computers and one or more storage devices on which are stored instructions that are operable, when executed by the one or more computers, to cause the one or more computers to perform operations comprising:
generating, by an enterprise content management process migration engine (ePME), a migration profile for migrating data from a first enterprise content management (ECM) system to a second ECM system in response to receiving a request from a user to initiate a migration;

determining, by the ePME, content to extract associated with a process template from the first ECM system, wherein the process template defines an activity framework of at least one process and at least one activity associated with the at least one process;

identifying, by the ePME, at least one process and at least one activity associated with the at least one process in the process template;

determining, by the ePME, at least one classification associated with the at least one process activity in the process template;

generating, by the ePME, a second ECM system architecture having an activity framework in the second ECM system that matches a first ECM system architecture of the activity framework in the first ECM system;

generating, by the ePME, a database in the second ECM system storing the second ECM system architecture, wherein the second ECM system architecture comprises each of the at least one process, the at least one activity, and the associated at least one classification from the process template; and validating, by the ePME, a successful transaction between the first ECM system and the second ECM system.

10. The system of claim 9, wherein the operations further comprise:
in response to storing the at least one process activity and the at least one associated classification from the process template, auditing, by the ePME, at least one event associated with the migrating data in the migration profile.

11. The system of claim 9, wherein the at least one classification comprises a process profile ID, a process name, an activity name, an activity type, an activity performer, a type of performer, a source activity, a target activity, and a connectivity type.

12. The system of claim 9, wherein the operations further comprise:
in response to validating the successful transaction as unsuccessful, retrieving the migration profile and executing the migration profile to correct the unsuccessful transaction.

13. The system of claim 9, wherein the operations further comprise:
storing, by the ePME, the database in the second ECM system with the migration profile in response to generating the database in the second ECM system.

14. The system of claim 9, wherein determining the process template associated with extraction of content from the first ECM system further comprises:
receiving, by the ePME, a selection of the process template from a client device in response to providing a list of process templates to the client device.

15. The system of claim 10, wherein the operations further comprise:
providing, by the ePME, at least one notification to a client device in response to the at least one event associated with the migrating data in the migration profile.

16. The system of claim 9, wherein validating the successful transaction between the first ECM system and the second ECM system the operations further comprise:

comparing, by the ePME, the data in the second ECM system to staging data indicating the at least one process and the least one activity associated with the at least one process associated with the process template in the first ECM system; and generating, by the ePME, a summary report that comprises the successful transaction in response to determining a match between the data in the second ECM system to the staging data.

17. A non-transitory computer-readable medium storing software comprising instructions executable by one or more computers which, upon such execution, cause the one or more computers to perform operations comprising:

generating, by an enterprise content management process migration engine (ePME), a migration profile for migrating data from a first enterprise content management (ECM) system to a second ECM system in response to receiving a request from a user to initiate a migration;

determining, by the ePME, content to extract associated with a process template from the first ECM system, wherein the process template defines an activity framework of at least one process and at least one activity associated with the at least one process;

identifying, by the ePME, at least one process and at least one activity associated with the at least one process in the process template;

determining, by the ePME, at least one classification associated with the at least one process activity in the process template;

generating, by the ePME, a second ECM system architecture having an activity framework in the second ECM system that matches a first ECM system architecture of the activity framework in the first ECM system;

generating, by the ePME, a database in the second ECM system storing the second ECM system architecture, wherein the second ECM system architecture comprises each of the at least one process, the at least one activity, and the associated at least one classification from the process template; and validating, by the ePME, a successful transaction between the first ECM system and the second ECM system.

18. The computer-readable medium of claim 17, wherein the operations comprise:

in response to storing the at least one process activity and the at least one associated classification from the process template, auditing, by the ePME, at least one event associated with the migrating data in the migration profile.

19. The computer-readable medium of claim 17, wherein the at least one classification comprises a process profile ID, a process name, an activity name, an activity type, an activity performer, a type of performer, a source activity, a target activity, and a connectivity type.

20. The computer-readable medium of claim 17, wherein the operations comprise:

in response to validating the successful transaction as unsuccessful, retrieving the migration profile and executing the migration profile to correct the unsuccessful transaction.

* * * * *